US010396705B2

(12) United States Patent
Anderson

(10) Patent No.: US 10,396,705 B2
(45) Date of Patent: Aug. 27, 2019

(54) ROOFTOP MOUNTING SYSTEM FOR FLEXIBLE PHOTOVOLTAIC MODULES

(71) Applicant: Global Solar Energy, Inc., Tucson, AZ (US)

(72) Inventor: Dale Huber Anderson, Tucson, AZ (US)

(73) Assignee: Global Solar Energy, Inc., Tucson, AZ (US)

( * ) Notice: Subject to any disclaimer, the term of this patent is extended or adjusted under 35 U.S.C. 154(b) by 0 days.

(21) Appl. No.: 16/053,677

(22) Filed: Aug. 2, 2018

(65) Prior Publication Data

US 2019/0044473 A1   Feb. 7, 2019

Related U.S. Application Data

(60) Provisional application No. 62/540,377, filed on Aug. 2, 2017.

(51) Int. Cl.
*H02S 20/23* (2014.01)
*H02S 30/00* (2014.01)
*E04D 3/30* (2006.01)

(52) U.S. Cl.
CPC .............. *H02S 20/23* (2014.12); *H02S 30/00* (2013.01); *E04D 3/30* (2013.01)

(58) Field of Classification Search
CPC .......... H02S 20/23; H02S 20/25; H02S 20/00; H02S 20/22; H02S 30/10; F24S 25/00; F24S 25/60; F24S 25/61; F24S 25/615; E04D 3/30
USPC ..................................................... 52/173.3
See application file for complete search history.

(56) References Cited

U.S. PATENT DOCUMENTS

| 8,984,818 B2 * | 3/2015 | McPheeters | H02S 20/00 52/173.3 |
| 2002/0129849 A1 | 9/2002 | Heckeroth | |
| 2010/0212661 A1 * | 8/2010 | Schwarze | H02S 20/23 126/705 |
| 2010/0320343 A1 * | 12/2010 | Beck | F24J 2/5239 248/226.11 |

(Continued)

FOREIGN PATENT DOCUMENTS

| EP | 2479514 A2 * | 7/2012 | ............. H02S 20/00 |
| FR | 2964129 A1 * | 3/2012 | ............. H02S 20/00 |

(Continued)

OTHER PUBLICATIONS

Machine translation of foreign reference FR 2964129 obtained from http://translationportal.epo.org/emtp/translate/?ACTION=description-retrieval&COUNTRY=FR&ENGINE=google&FORMAT=docdb&KIND=A1&LOCALE=en_EP&NUMBER=2964129&OPS=ops.epo.org/3.2&SRCLANG=fr&TRGLANG=en (last accessed on Nov. 2, 2018) (Year: 2018).*

(Continued)

*Primary Examiner* — Theodore V Adamos
(74) *Attorney, Agent, or Firm* — Kolitch Romano LLP

(57) ABSTRACT

A system for mounting flexible photovoltaic (PV) modules on ribbed rooftops (e.g., purlin bearing rib-style roofs) may include a pair of mating mounting brackets, one affixed to the PV module and the other affixed to a rib of the roof. The PV module may have a concave-down profile when installed, with standoffs installed on a bottom side of the module and hold-down ridge caps installed on adjacent ribs of the roof.

16 Claims, 6 Drawing Sheets

(56) References Cited

U.S. PATENT DOCUMENTS

| | | | |
|---|---|---|---|
| 2011/0073155 A1* | 3/2011 | Sillmann | F24J 2/5203 |
| | | | 136/244 |
| 2011/0197954 A1 | 8/2011 | Young et al. | |
| 2012/0180406 A1* | 7/2012 | Kobayashi | F24S 25/615 |
| | | | 52/173.3 |
| 2013/0160824 A1* | 6/2013 | Khouri | H01L 31/048 |
| | | | 136/251 |
| 2013/0206206 A1* | 8/2013 | Bjorneklett | H01L 31/048 |
| | | | 136/246 |
| 2014/0102016 A1* | 4/2014 | Hemingway | F24S 25/61 |
| | | | 52/173.3 |
| 2014/0283467 A1* | 9/2014 | Chabas | E04D 3/30 |
| | | | 52/173.3 |
| 2014/0345212 A1* | 11/2014 | Yoon | E04D 3/35 |
| | | | 52/173.3 |
| 2015/0168021 A1* | 6/2015 | Wentworth | H02S 20/23 |
| | | | 52/173.3 |
| 2015/0218822 A1* | 8/2015 | Blazley | E04D 3/30 |
| | | | 52/173.3 |
| 2016/0226434 A1* | 8/2016 | Tomlinson | H02S 20/23 |
| 2017/0353144 A1 | 12/2017 | Guo | |

FOREIGN PATENT DOCUMENTS

| | | | | |
|---|---|---|---|---|
| WO | 2013033670 A1 | 3/2013 | | |
| WO | WO-2018069333 A1 * | 4/2018 | ............ | H02S 20/23 |

OTHER PUBLICATIONS

Machine translation for foreign reference EP 2479514 obtained from http://translationportal.epo.org/emtp/translate/?ACTION=description-retrieval&COUNTRY=EP&ENGINE=google&FORMAT=docdb&KIND=A2&LOCALE=en_EP&NUMBER=2479514&OPS=ops.epo.org/3.2&SRCLANG=de&TRGLANG=en (last accessed on Nov. 2, 2018) (Year: 2018).*

U.S. Receiving Office, International Search Report and Written Opinion of the International Searching Authority, dated Oct. 24, 2018, in PCT/US2018/045050, which is the international application to this U.S. application.

\* cited by examiner

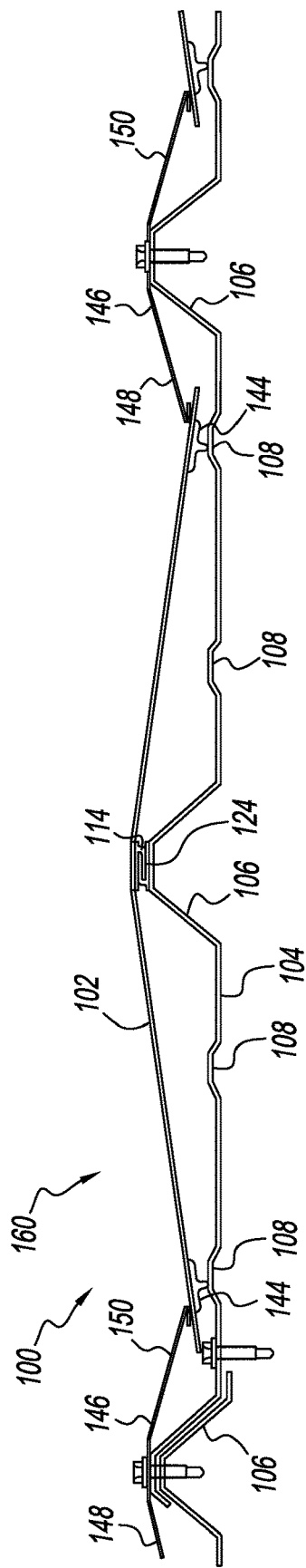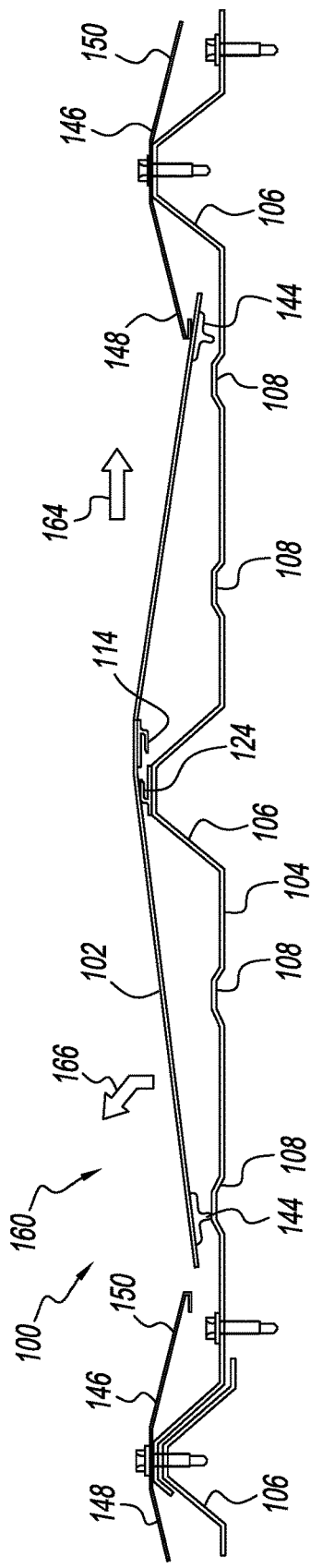

ROOFTOP MOUNTING SYSTEM FOR FLEXIBLE PHOTOVOLTAIC MODULES

CROSS-REFERENCES

This application claims the benefit under 35 U.S.C. § 119(e) of the priority of U.S. Provisional Patent Application Ser. No. 62/540,377, filed Aug. 2, 2017, the entirety of which is hereby incorporated by reference for all purposes.

FIELD

This disclosure relates to systems and methods for mounting solar panels. More specifically, the disclosed embodiments relate to mounting flexible photovoltaic modules on a ribbed rooftop.

INTRODUCTION

Systems for mounting flexible photovoltaic (PV) modules on rooftops typically involve mounting modules directly to rooftops, or attaching modules to mounting structures that are placed on rooftops.

Mounting a module directly to a rooftop often increases its operational temperature, because the module absorbs heat from the roof. Moreover, directly attaching modules to rooftops may require undesirable alterations to the roof. For example, mounting modules using adhesives on roofing surfaces may make removal of modules difficult, e.g., if the roof needs to be repaired or replaced. Alternatively, mounting modules to rooftops with fasteners typically requires the fasteners to penetrate the roof, which can result in water incursion into the building, among other issues.

Another disadvantage of directly mounting modules to rooftops is that the modules themselves can become vulnerable to water intrusion. Water may seep into the modules, particularly at the module edges, causing a compromise in performance. The alternative of using solar module mounting structures can be expensive. Additionally, assembling and installing such mounting structures, as well as removing them from rooftops, may be time consuming and labor intensive. Accordingly, there is a need for an improved mounting system that may be simply and economically installed on common rooftops, such as ribbed metal rooftops.

SUMMARY

The present disclosure provides systems, apparatuses, and methods relating to systems for mounting flexible photovoltaic (PV) modules on ribbed rooftops. In some embodiments, a system for mounting flexible PV modules on a rooftop may include: a first elongate mounting bracket including a base coupled to a first rib of a ribbed rooftop, a first stem portion extending transversely from the base, and a first flange extending parallel to the base from the first stem portion, such that a distal end of the first flange is spaced from the base, defining a first channel; a flexible PV module; and a second elongate mounting bracket attached to the flexible PV module and including an upper plate secured to the flexible PV module, a second stem portion extending transversely from the upper plate, and a second flange extending from the second stem portion parallel to the upper plate, such that a distal end of the second flange is spaced from the upper plate, defining a second channel; wherein the system is transitionable between (a) a roof-mounted configuration, in which the second elongate mounting bracket is coupled to the first elongate mounting bracket, the first flange being received by the second channel and the second flange being received by the first channel, and (b) an unmounted configuration, in which the second elongate mounting bracket is decoupled from the first elongate mounting bracket and the flexible PV module is separated from the rooftop.

In some embodiments, a system for mounting flexible PV modules on a rooftop may include: a first elongate mounting bracket including a base configured to be coupled to a first rib of a ribbed rooftop and a first flange extending parallel to the base to define a first channel, such that a distal end of the first flange is spaced from the base; and a flexible PV module having a second elongate mounting bracket oriented along a central longitudinal axis of the flexible PV module, the second elongate mounting bracket including an upper plate secured to the flexible PV module and a second flange extending parallel to the upper plate to define a second channel, such that a distal end of the second flange is spaced from the upper plate; wherein the system is transitionable between (a) a roof-mounted configuration, in which the second elongate mounting bracket is coupled to the first elongate mounting bracket, the first flange being received by the second channel and the second flange being received by the first channel, and (b) an unmounted configuration, in which the second elongate mounting bracket is decoupled from the first elongate mounting bracket and the flexible PV module is separated from the rooftop.

In some embodiments, a method for mounting a flexible photovoltaic (PV) module on a ribbed roof may include: securing a first elongate mounting bracket to a roofing panel, the roofing panel including a plurality of major ribs having a consistent spacing, such that a base of the first elongate mounting bracket is secured to a first major rib of the plurality of major ribs, the first elongate mounting bracket further including a first stem portion extending transversely from the base and a first flange extending parallel to the base from the first stem portion, such that a distal end of the first flange is spaced from the base, defining a first channel; and mounting a flexible PV module having a second elongate mounting bracket to the roofing panel by inserting a second flange of the second mounting bracket into the first channel of the first mounting bracket and inserting the first flange of the first mounting bracket into a second channel of the second mounting bracket.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 3 is a front elevation view of an illustrative PV module mounting system in a first configuration.

FIG. 4 is a front elevation view of the PV module mounting system of FIG. 3 in a second configuration.

DETAILED DESCRIPTION

Figure 1:
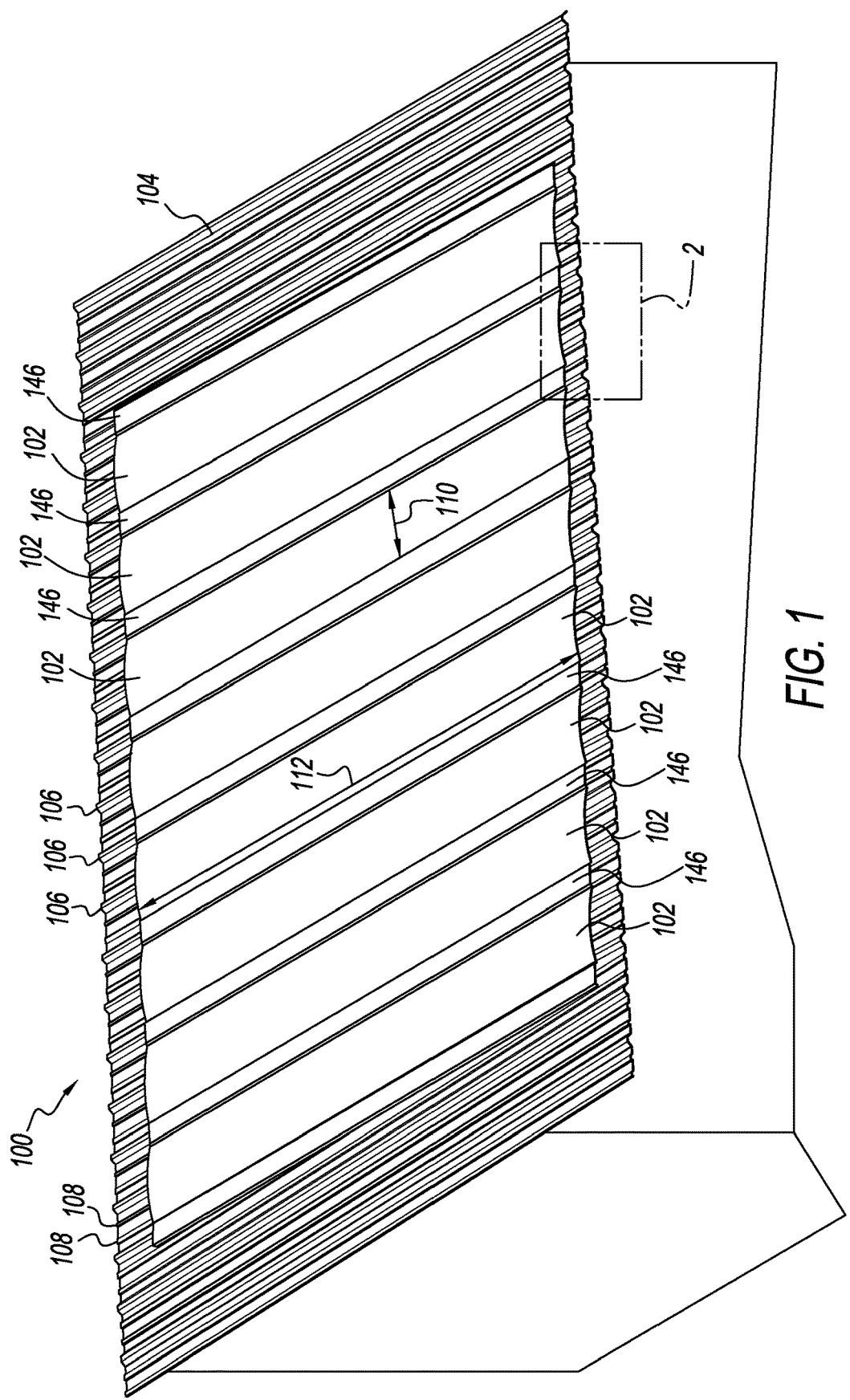
FIG. 1 is an isometric view of an illustrative flexible photovoltaic (PV) module mounting system in accordance with aspects of the present disclosure, installed on a building rooftop.

Various aspects and examples of a rooftop mounting system for flexible photovoltaic modules (AKA solar panels), as well as related methods, are described below and illustrated in the associated drawings. Unless otherwise specified, a rooftop mounting system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A and B, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Resilient" describes a material or structure configured to be deformed elastically under normal operating loads (e.g., when compressed) and to return to an original shape or position when unloaded.

"Rigid" describes a material or structure configured to be stiff, non-deformable, or substantially lacking in flexibility under normal operating conditions.

Overview

The present teachings relate to systems and methods for mounting flexible photovoltaic modules to a ribbed rooftop. In general, systems described herein include corresponding module and rooftop mounting brackets for securing the modules to the rooftop. In some examples, the systems include standoff members to maintain separation between the module and the roof and/or edge clamping members to secure edges of the module against wind uplift or the like. As described below, standoff members may be referred to as standoffs, and edge clamping members may be referred to as ridge caps.

Module mounting brackets are configured to be affixed to a flexible photovoltaic module, whereas the rooftop mounting brackets are configured to be affixed to a ribbed roof. Furthermore, the module mounting bracket and the rooftop mounting bracket are configured to mate (e.g., slide into engagement) with each other, thereby coupling the module to the rooftop.

Fasteners may be inserted through aligned apertures in the module mounting bracket and rooftop mounting bracket, thereby securing the module in place. Standoffs at the lateral edges of the module may be used to elevate the module above the roof to reduce or prevent water incursion into the module, while ridge caps may be used provide resistance against wind uplift.

Examples, Components, and Alternatives

The following sections describe selected aspects of exemplary rooftop mounting systems for flexible PV modules, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Flexible PV Module Mounting System

As shown in FIGS. 1-7, this section describes an illustrative flexible photovoltaic (PV) module mounting system 100 for ribbed rooftops. System 100 is an example of the systems described in the Overview, above.

Figure 2:
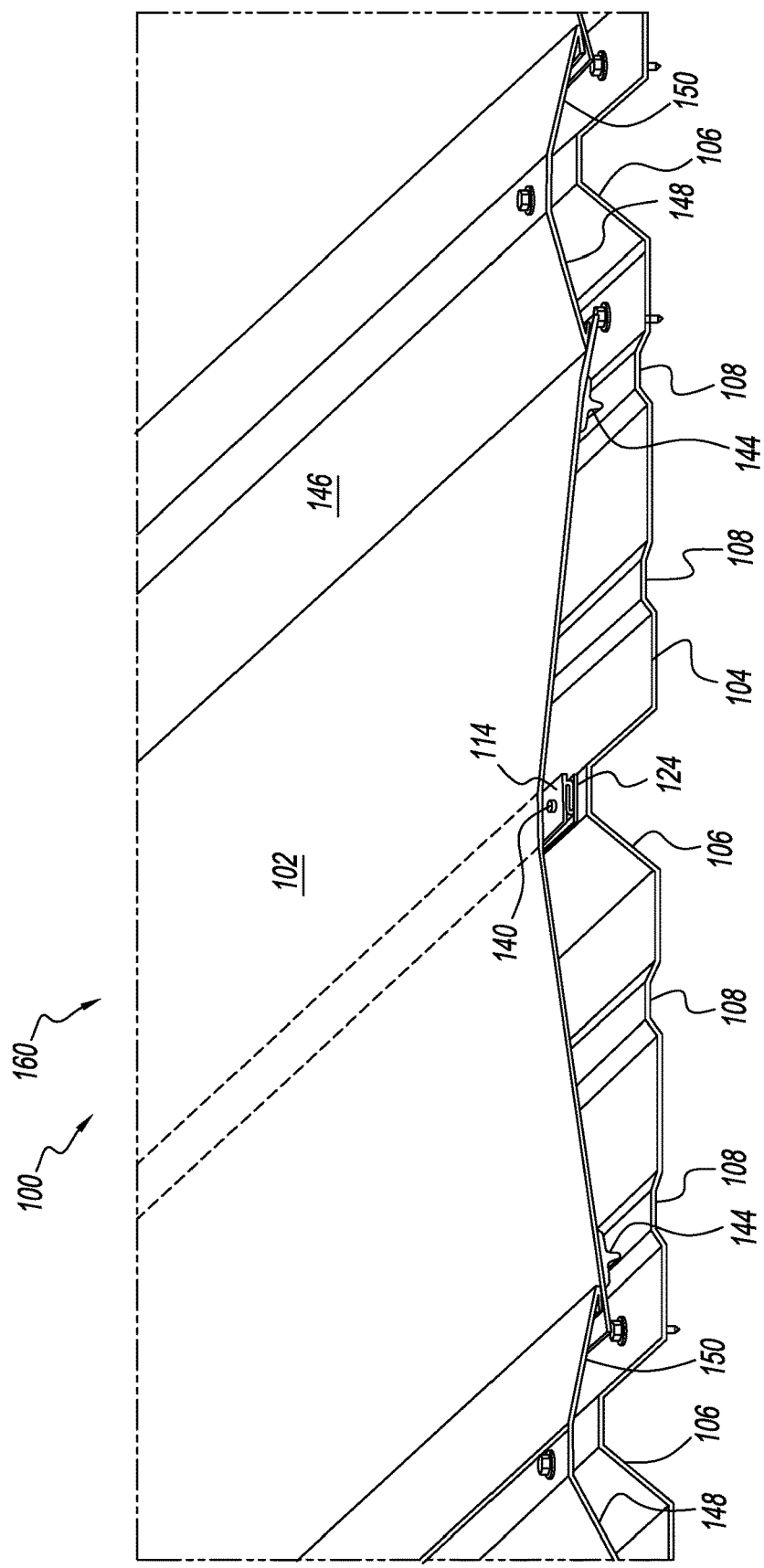
FIG. 2 is a magnified portion of an illustrative flexible PV module mounting system in accordance with aspects of the present disclosure, generally corresponding to the region identified by broken line 2 of FIG. 1.
Figure 5:
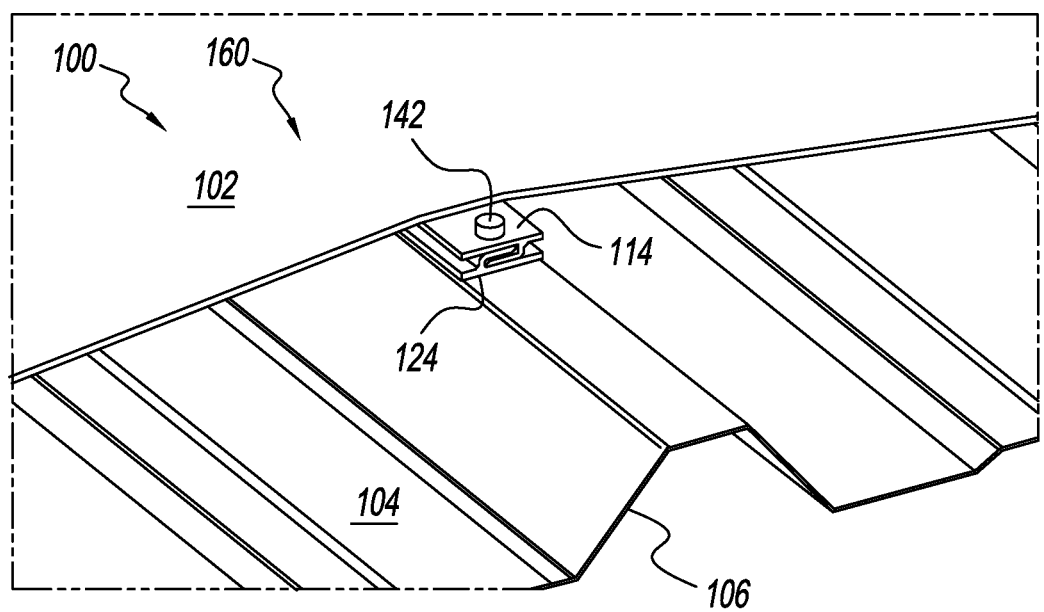
FIG. 5 is a magnified isometric view of a portion of an illustrative PV mounting system, showing an end fastener.
Figure 6:
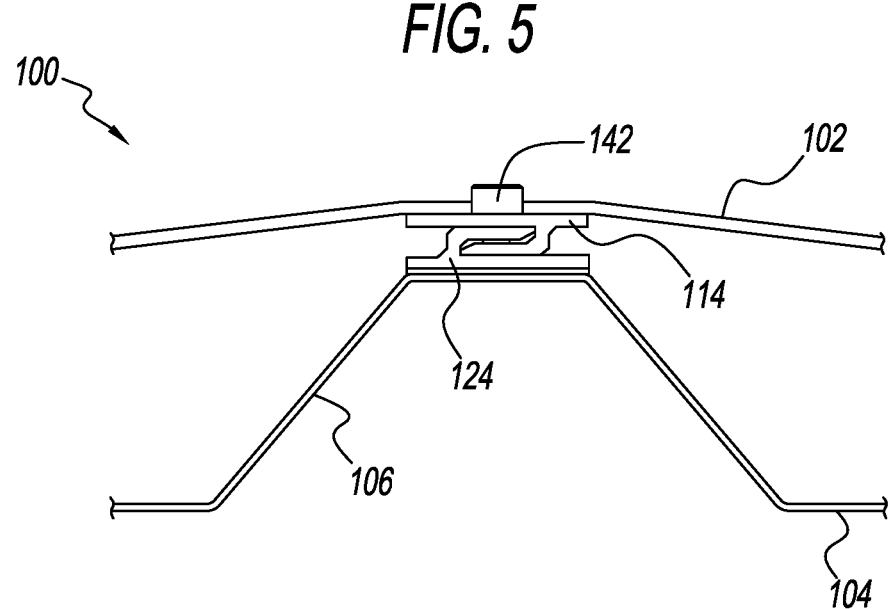
FIG. 6 is an end elevation view of a portion of the PV mounting system of FIG. 5, showing relationships between selected components.
Figure 7:
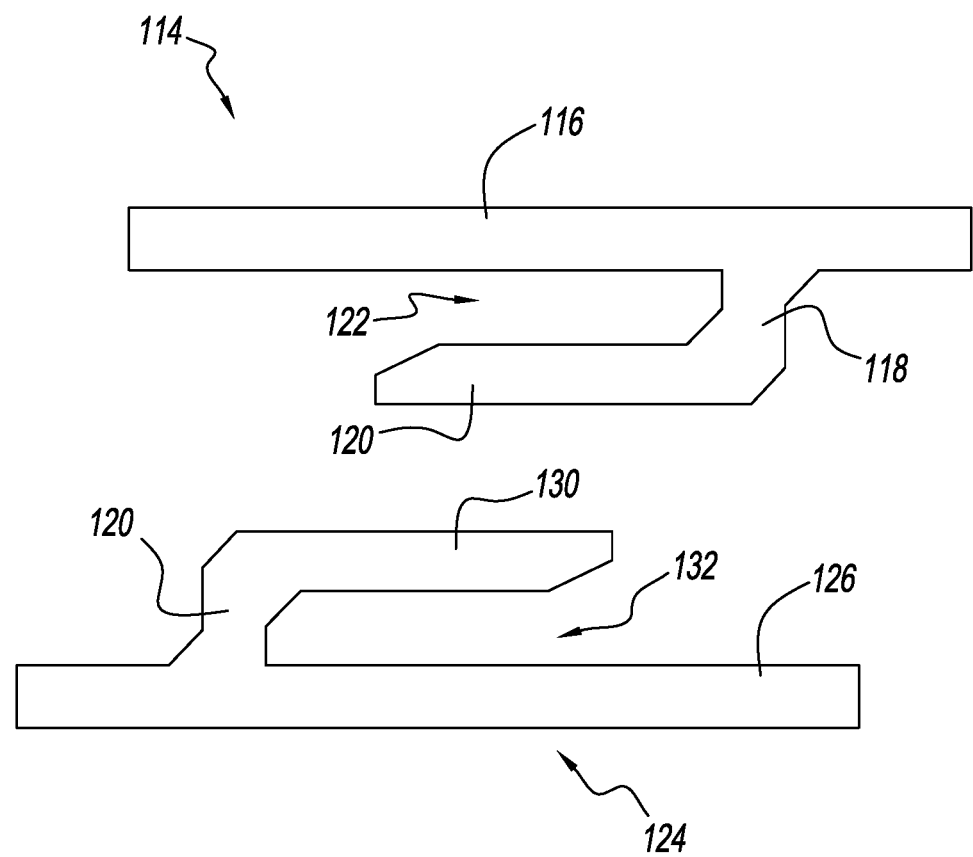
FIG. 7 is an end elevation view of a pair of illustrative mounting brackets suitable for use with PV mounting systems described herein.

FIG. 1 is an isometric view of an illustrative ribbed rooftop having several flexible PV modules mounted thereon using system 100, in accordance with aspects of the present disclosure. FIG. 2 is a magnified view of an edge portion of the rooftop of FIG. 1. FIGS. 3 and 4 are side elevation views of the system of FIGS. 1 and 2, showing how the PV module may be transitioned from a mounted to a released position, e.g., for removal or replacement. FIGS. 5 and 6 are another magnified view and elevation view, showing a hold-down fastener installed in an end of one of the PV module mounting systems. FIG. 7 is a sectional view of a pair of mounting brackets suitable for use with system 100.

With continuing reference to FIGS. 1-7, mounting system 100 includes a flexible PV module 102 attachable to a ribbed rooftop 104. As depicted in FIG. 1 and elsewhere, a plurality of such PV modules may be mounted on the same rooftop, each module using system 100. In some examples, adjacent PV modules may share certain components (e.g., ridge caps), as described further below. Rooftop 104 may include any suitable roof having a plurality of parallel ribs or ridges on an upper surface. In the examples described here, rooftop 104 includes purlin bearing rib (PBR) panels, which have a plurality of spaced-apart trapezoidal ribs running generally parallel to underlying rafters of the roof. In some buildings, e.g., prefabricated metal buildings, steel purlins are attached across rafters of the roof, and the PBR panels attach to the purlins. PBR panels include larger ribs 106 separated by smaller ribs 108, increasing the strength of the roof (as compared with flat panels) without adding weight. In this example, the large ribs are 1.25 inches in height, and are spaced at twelve inches center to center. Roof panels are not limited to the construction shown in FIGS. 1-6. Suitable rooftop panels having differently shaped and/or sized ribs may be utilized. For example, rooftop panels may have ribs with triangular or hemispherical cross sections, large ribs may be spaced apart closer or farther than twelve inches, more or fewer (or no) small ribs may be interspersed between large ribs, and/or rib heights may be larger or smaller than 1.25 inches.

PV module 102 may include any suitable rugged, flexible photovoltaic module configured to be mounted on a building (e.g., a rooftop) and having sufficient structural integrity to hold its shape when mounted as described herein. In some examples, a backing or additional substrate may be added to the PV module. In some examples, the flexible PV module may be sufficiently stiff that it provides a strong enough curved structure, when supported as described, without any additional backing. For example, a suitable example of module 102 is a building applied photovoltaic (BAPV) system having a plurality of copper indium gallium diselenide (CIGS) PV cells and a thickness of approximately three millimeters (mm). This type of PV module is currently sold under the brand name PowerFLEX®+ by Global Solar, Inc. This illustrative flexible PV module is about 2.3 to 2.4 kg/m² (+/−5%) in weight. However, PV module 102 is not limited to that example, and any suitable flexible PV module may be utilized.

PV module 102 has an elongate rectangular shape, with a shorter width 110 and a longer length 112 (e.g., as measured along lateral (AKA side) edges of the module). Suitable widths may be less than approximately 20 inches, e.g., approximately 494 mm (19.45 inches). Suitable lengths may be determined by the size or configuration of roof 104, and/or as desired by the user. As depicted in FIG. 1, modules 102 are mounted in parallel with ribs 106 of the rooftop, such that a long axis of the module is oriented in the same direction as the ribs.

PV module 102 includes a module mounting bracket 114 running centrally along the length of the module on a lower (i.e., roof-facing) face of the module. Bracket 114, also referred to as an upper hook, includes a top plate 116 (AKA an upper plate) coupled to the PV module, a stem portion 118 extending transversely (e.g., orthogonally) from upper plate 116, and a flange portion 120 extending from stem portion 118, generally parallel to plate 116. See FIG. 7. Accordingly, flange portion 120 overlaps upper plate 116, with a distal end of the flange portion being spaced from the upper plate, defining a gap or an open channel 122. As depicted in the drawings, the distal end of flange portion 120 may be tapered or otherwise shaped to facilitate mating with a corresponding mounting bracket (see below). Module mounting bracket 114 may be secured or affixed to PV module 102 along a longitudinal axis by any suitable method. For example, bracket 114 may be affixed to PV module 102 by an adhesive. The adhesive may include a mastic adhesive (e.g., ADCO HelioBond™ PVA 600BT butyl mastic), although any suitable adhesive may be used. In some examples, module mounting bracket 114 is a continuous structure coextensive with module 102, i.e., extending at least as long as length 112, although other lengths may be utilized. In some examples, module mounting bracket 114 includes a plurality of shorter, discrete mounting bracket portions spaced apart along the central axis of the module, such that gaps are formed between adjacent bracket portions.

A corresponding rooftop mounting bracket 124 is secured to one of ribs 106, and is configured to mate with module mounting bracket 114. Accordingly, bracket 124, also referred to as a lower hook, includes a base portion 126 (AKA a base plate and/or bottom plate) coupled to the roof, a stem portion 128 extending transversely (e.g., orthogonally) from base portion 126, and a flange portion 130 extending from stem portion 128, generally parallel to base portion 126. Accordingly, flange portion 130 overlaps base portion 126, with a distal end of the flange portion being spaced from the base plate, defining a gap or an open channel 132. Similar to flange portion 120, the distal end of flange portion 130 may be tapered or otherwise shaped to facilitate mating with bracket 114. In this example, rib 106 has a flat-topped trapezoidal shape, and a bottom surface of base portion 126 is flat as well, to facilitate proper attachment. In other examples, the bottom surface of base portion 126 may be shaped to conform to a differently-shaped rib (e.g., triangular or rounded).

Rooftop mounting bracket 124 may be secured or affixed to the roof along rib 106 by any suitable method. For example, bracket 124 may be affixed to roof 104 by an adhesive. The adhesive may include a mastic adhesive, as described above, although any suitable adhesive may be used. In some examples, rooftop mounting bracket 124 is a continuous structure, coextensive with module 102, i.e., extending at least as long as length 112, although other lengths may be utilized. In some examples, module mounting bracket 124 includes a plurality of shorter, discrete mounting bracket portions spaced apart along the central axis of the module, such that gaps are formed between adjacent bracket portions. In some examples, bracket 114 is continuous while bracket 124 includes shorter, discrete portions, or vice versa. Brackets 114 and 124 may comprise any suitable stiff, strong, and lightweight materials, such as anodized aluminum. In some examples, bracket 114 and bracket 124 may each comprise an extruded structure, formed as a single piece.

Accordingly, PV module 102 may be coupled to roof 104 by mating bracket 114 with bracket 124. Specifically, flange portions 120 and 130 may be simultaneously inserted or slid into channels 132 and 122, respectively. In some examples, this may be performed by mutually inserting the flanges in a direction transverse to the length of the module. In some examples, this may be performed by sliding module mounting bracket 114 into rooftop mounting bracket 124 lengthwise. In some examples, this may be performed by some combination of these two directions, e.g., by obtaining initial engagement of the brackets in a diagonal direction and pivoting them together laterally. Channels 122 and 132 may each be sized to receive the opposing flange portion, e.g., in a friction fit and/or a sliding fit. Disengagement of the PV module from the roof may include reversing the mating process, such that flanges 120 and 130 are removed from channels 132 and 122.

Mating of mounting brackets 114 and 124 may be further secured by insertion of a fastener through both brackets at one or both ends of the module. See FIGS. 5 and 6. For example, opposing ends of module mounting bracket 114 may include a pair of aligned apertures or holes 140, one or both of which may be threaded. One or more corresponding apertures may be present in corresponding ends of rooftop mounting bracket 124. A fastener 142, such as a pin, locking pin, cotter pin, or screw, may be removably inserted through two or more of the aligned holes. A screw, for example, may be threadingly engaged in aligned apertures 140 and the one or more apertures in the rooftop mounting bracket, thereby preventing unwanted disengagement of flange portions 120 and 130 from channels 132 and 122. In some examples, only one (e.g., the bottommost) aperture may be threaded. Fastener 142 may be removed when removing or replacing PV module 102.

As depicted in FIGS. 1 and 2, PV module 102 is concave down when installed, i.e., forming a concavity on the roof-facing face of the module, wherein the lateral edges of the module are closer to the roof than the center of the module is. Said another way, the central axis of PV module 102 is mounted in a raised position, by virtue of rib 106 and brackets 114, 124, as compared with lateral edges of the module. The lateral edges of the flexible module are disposed lower than the center as a result of gravity. This arrangement may be further enhanced and/or controlled by creasing the module, e.g., longitudinally on either side of the central bracket (as shown in FIG. 2), clamping the lateral edges in place, and/or by weighting the lateral edges. See below. In some examples, the central height of the module above the rooftop may be further controlled by using a module mounting bracket and/or rooftop mounting bracket having a selected overall height (e.g., stem length, base thickness, etc.).

One or more standoffs 144 (AKA separators) may be coupled to a lower face of PV module 102 proximate the lateral edges. Standoffs 144 may include any suitable structure configured to separate the module edges from the rooftop and physically prevent the module from touching rooftop 104. This is desirable because of water incursion, shorting, friction damage, etc., that may occur if edges of the module are allowed to contact the roof panels. As shown in FIGS. 2-4, standoffs 144 may include a T-shaped attachment having a base attached to the module and a protruding stem sized and configured to abut against rooftop 104. In some examples, standoffs 144 are discrete units attached at various spaced locations along each lateral edge. In some examples, standoffs 144 extend lengthwise for some distance along each edge. As with other components, standoffs 144 may be coupled to PV module 102 by any suitable method, including adhesive (e.g., a mastic adhesive). In addition to the function of separation enforcement, standoffs 144 may facilitate the maintenance of a "concave down" or "convex up" contour of the PV module, by adding weight to the lateral edges of the module.

System 100 may optionally include hold-down devices configured to clamp or abut the module's lateral edges, in the form of ridge caps 146. Each ridge cap 146 may include an elongate sheet affixed to the top of one of the large ribs 106 adjacent PV module 102. In some examples, ridge caps 146 may be mostly flat, with downward pointing flanges (See FIG. 1). In the example shown in FIGS. 2-4, ridge caps 146 have a peaked shape, with a pair of side wings 148, 150 extending laterally to overlap side edges of PV module 102 and thereby prevent upward movement of the PV module (e.g., during upward forces caused by wind). A central portion of ridge cap 146 is coupled to rib 106 by any suitable fastener configured to withstand expected wind forces, e.g., screws, bolts, rivets, and/or adhesive. Ridge cap 146 may comprise any suitably strong material configured to avoid damaging the PV module, such as a coated steel or aluminum. As depicted in the drawings, each ridge cap 146 may be configured to hold down a lateral edge of each of two adjacent PV modules, such that two ridge caps are utilized per PV module. Ridge caps 146 may be continuous structures generally coextensive with module 102, i.e., extending approximately as long as length 112, although other lengths may be utilized. In some examples, ridge caps 146 include a plurality of shorter, discrete portions spaced apart along the rib, such that gaps are formed between adjacent portions.

Based on the above description, it may be understood that system 100 is selectively transitionable between (a) a roof-mounted (AKA first) configuration 160, in which module mounting bracket 114 of PV module 102 is mated with rooftop mounting bracket 124 and bracket 124 is affixed to roof 104, and (b) an unmounted (AKA second) configuration 162, in which module mounting bracket 114 is disengaged from rooftop mounting bracket 124 while mounting bracket 124 remains affixed to the roof. See FIGS. 3 and 4. Mounted configuration 160 may further include a fastener inserted into aligned apertures of the brackets at one or both ends of the module. See FIGS. 5 and 6. Transitioning from the mounted to the unmounted configuration may include removing the fastener and sliding the module laterally (see arrow 164 in FIG. 6), under the ridge caps, until the brackets disengage, then angling one side of the module away from the roof and removing it (see arrow 166). The reverse may be performed to go from unmounted configuration 162 to mounted configuration 160.

Additionally or alternatively, and based on the discussion above, a system for mounting a flexible PV module on a ribbed roof may be further described as laid out in the alphanumerically identified paragraphs below.

A0. A system for mounting flexible photovoltaic (PV) modules on a rooftop, the system comprising:

a first elongate mounting bracket including a base coupled to a first rib of a ribbed rooftop, a first stem portion extending transversely from the base, and a first flange extending parallel to the base from the first stem portion, such that a distal end of the first flange is spaced from the base, defining a first channel;

a flexible PV module; and a second elongate mounting bracket attached to the flexible PV module and including an upper plate secured to the flexible PV module, a second stem portion extending transversely from the upper plate, and a second flange extending from the second stem portion parallel to the upper plate, such that a distal end of the second flange is spaced from the upper plate, defining a second channel;

wherein the system is transitionable between (a) a roof-mounted configuration, in which the second elongate mounting bracket is coupled to the first elongate mounting bracket, the first flange being received by the second channel and the second flange being received by the first channel, and (b) an unmounted configuration, in which the second elongate mounting bracket is decoupled from the first elongate mounting bracket and the flexible PV module is separated from the rooftop.

A1. The system of A0, further comprising a plurality of aligned apertures in respective end portions of the first elongate mounting bracket and the second elongate mounting bracket, the plurality of aligned apertures configured to receive a fastener.

A2. The system of A1, wherein at least one of the plurality of aligned apertures is threaded.

A3. The system according to any one of paragraphs A0 through A2, wherein the upper plate is secured to the flexible PV module by an adhesive.

A4. The system according to any one of paragraphs A0 through A3, wherein the second elongate mounting bracket is disposed along a central longitudinal axis of the flexible PV module.

A5. The system according to any one of paragraphs A0 through A4, wherein the first elongate mounting bracket is at least as long as the flexible PV module.

A6. The system according to any one of paragraphs A0 through A5, wherein the second elongate mounting bracket is at least as long as the flexible PV module.

A7. The system according to any one of paragraphs A0 through A6, the flexible PV module comprising a plurality of copper indium gallium diselenide (CIGS) PV cells.

A8. The system according to any one of paragraphs A0 through A7, further comprising a first ridge cap affixed to a second rib of the rooftop adjacent a first lateral edge of the flexible PV module and a second ridge cap affixed to a third rib of the rooftop adjacent a second lateral edge of the flexible PV module;

wherein each of the first and second ridge caps includes at least one side wing configured to abut a top face of the flexible PV module.

A9. The system according to any one of paragraphs A0 through A8, further comprising a plurality of standoffs coupled to a lower face of the flexible PV module, the plurality of standoffs collectively configured to prevent contact between lateral edges of the PV module and the roof.

A10. The system according to any one of paragraphs A0 through A9, wherein the flexible PV module has a width measured between lateral edges of the flexible PV module, and a length longer than the width.

A11. The system of A10, wherein the ribbed rooftop has a rib spacing distance, and the width of the flexible PV module is less than two times the rib spacing distance.

A12. The system of A11, wherein the rib spacing distance is 12 inches.

A13. The system of A10, wherein the width of the flexible PV module is less than 20 inches.

A14. A system for mounting flexible photovoltaic (PV) modules on a rooftop, the system comprising:

a first elongate mounting bracket including a base configured to be coupled to a first rib of a ribbed rooftop and a first flange extending parallel to the base to define a first channel, such that a distal end of the first flange is spaced from the base; and a flexible PV module having a second elongate mounting bracket oriented along a central longitudinal axis of the flexible PV module, the second elongate mounting bracket including an upper plate secured to the flexible PV module and a second flange extending parallel to the upper plate to define a second channel, such that a distal end of the second flange is spaced from the upper plate;

wherein the system is transitionable between (a) a roof-mounted configuration, in which the second elongate mounting bracket is coupled to the first elongate mounting bracket, the first flange being received by the second channel and the second flange being received by the first channel, and (b) an unmounted configuration, in which the second elongate mounting bracket is decoupled from the first elongate mounting bracket and the flexible PV module is separated from the rooftop.

A15. The system of A14, further comprising a plurality of aligned apertures in respective end portions of the first elongate mounting bracket and the second elongate mounting bracket, the plurality of aligned apertures configured to receive a fastener.

A16. The system of A15, wherein at least one of the plurality of aligned apertures is threaded.

A17. The system according to any one of paragraphs A14 through A16, wherein the upper plate is secured to the flexible PV module by an adhesive.

A18. The system according to any one of paragraphs A14 through A18, wherein the second elongate mounting bracket is disposed along a central longitudinal axis of the flexible PV module.

A19. The system according to any one of paragraphs A14 through A18, wherein the first elongate mounting bracket is at least as long as the flexible PV module.

A20. The system according to any one of paragraphs A14 through A19, wherein the second elongate mounting bracket is at least as long as the flexible PV module.

A21. The system according to any one of paragraphs A14 through A20, the flexible PV module comprising a plurality of copper indium gallium diselenide (CIGS) PV cells.

A22. The system according to any one of paragraphs A14 through A21, further comprising a first ridge cap affixed to a second rib of the rooftop adjacent a first lateral edge of the flexible PV module and a second ridge cap affixed to a third rib of the rooftop adjacent a second lateral edge of the flexible PV module;

wherein each of the first and second ridge caps includes at least one side wing configured to abut a top face of the flexible PV module.

A23. The system according to any one of paragraphs A14 through A22, further comprising a plurality of standoffs coupled to a lower face of the flexible PV module, the plurality of standoffs collectively configured to prevent contact between lateral edges of the PV module and the roof.

A24. The system according to any one of paragraphs A14 through A23, wherein the flexible PV module has a width measured between lateral edges of the flexible PV module, and a length longer than the width.

A25. The system of A24, wherein the ribbed rooftop has a rib spacing distance, and the width of the flexible PV module is less than two times the rib spacing distance.

A26. The system of A25, wherein the rib spacing distance is 12 inches.

A27. The system of A24, wherein the width of the flexible PV module is less than 20 inches.

B. Illustrative Method

Figure 8:
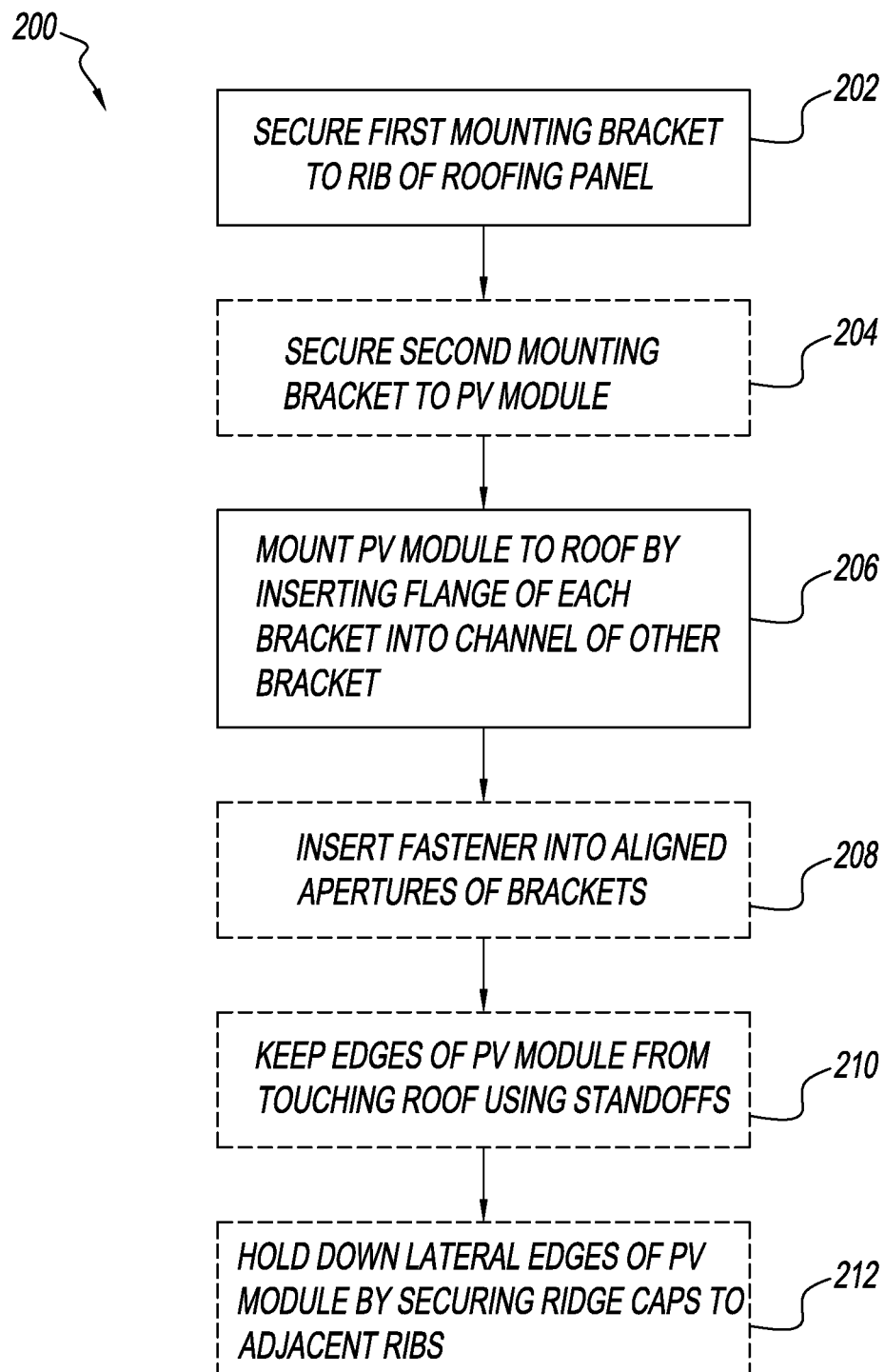
FIG. 8 is a is a flow chart depicting steps of an illustrative method for mounting flexible PV modules on a ribbed roof, according to the present teachings.

This section describes steps of an illustrative method 200 for mounting a flexible PV module on a ribbed rooftop; see FIG. 8. Aspects of PV mounting systems described above may be utilized in the method steps described below. Where appropriate, reference may be made to components and systems that may be used in carrying out each step. These references are for illustration, and are not intended to limit the possible ways of carrying out any particular step of the method.

FIG. 8 is a flowchart illustrating steps performed in an illustrative method, and may not recite the complete process or all steps of the method. Although various steps of method 200 are described below and depicted in FIG. 8, the steps need not necessarily all be performed, and in some cases may be performed simultaneously or in a different order than the order shown.

Step 202 of method 200 includes securing a first mounting bracket to a rib of a ribbed roofing panel. Step 202 may include, for example, attaching rooftop mounting bracket 124 to one of ribs 106, e.g., using an adhesive (e.g., a mastic adhesive). The ribbed roofing panel may be installed on a building roof (e.g., see FIG. 1).

Step 204 of method 200 includes securing a second mounting bracket to a flexible photovoltaic (PV) module. Step 204 may include, for example, attaching module mounting bracket 114 to PV module 102 using an adhesive (e.g., mastic adhesive). This step may be optional, e.g., if the PV module is obtained with the second mounting bracket already installed.

Step 206 of method 200 includes mounting the PV module to the roof by inserting a respective flange of each bracket into a corresponding channel of the other bracket. Step 206 may include, for example, mating brackets 114 and 116 to each other by inserting flanges 120 and 130 into channels 132 and 122, respectively.

Step 208 of method 200 includes reversibly securing the brackets to each other by inserting a fastener into aligned apertures of the two brackets. Step 208 may include, for example, inserting fastener 142 into holes 140 and one or more corresponding holes in bracket 124, e.g., by threaded engagement. In some examples, step 208 is optional.

Step 210 of method 200 includes preventing the lateral edges of the PV module from touching the roof using a plurality of separators or standoffs. Step 210 may include, for example, using standoffs 144 to separate the lateral edges of PV module 102 from roof 104. In some examples, step 210 is optional.

Step 212 of method 200 includes holding down the lateral edges of the PV module by securing ridge caps to adjacent ribs of the roofing panel. Step 212 may include, for example, attaching one ridge cap 146 to each of the ribs 106 on either side of the PV module. In some examples, step 212 is optional.

Additionally or alternatively, and based on the discussion above, a method for mounting a PV module on a ribbed roof may be further described as laid out in the alphanumerically identified paragraphs below.

B0. A method for mounting a flexible photovoltaic (PV) module on a ribbed roof, the method comprising:

securing a first elongate mounting bracket to a roofing panel, the roofing panel including a plurality of major ribs having a consistent spacing, such that a base of the first elongate mounting bracket is secured to a first major rib of the plurality of major ribs, the first elongate mounting bracket further including a first stem portion extending transversely from the base and a first flange extending parallel to the base from the first stem portion, such that a distal end of the first flange is spaced from the base, defining a first channel; and mounting a flexible PV module having a second elongate mounting bracket to the roofing panel by inserting a second flange of the second mounting bracket into the first channel of the first mounting bracket and inserting the first flange of the first mounting bracket into a second channel of the second mounting bracket.

B1. The method of B0, wherein the flexible PV module has a concave-down profile, such that lateral edges of the flexible PV module are disposed closer to the roof than the central longitudinal axis of the flexible PV module.

B2. The method of B0 or B1, further comprising:

preventing lateral edges of the flexible PV module from contacting the roof using a plurality of standoffs coupled to a lower face of the flexible PV module.

B3. The method according to any one of paragraphs B0 through B2, wherein the flexible PV module has a width measured between lateral edges of the flexible PV module, and a length longer than the width.

B4. The method of B3, wherein the width of the flexible PV module is less than two times the spacing between the major ribs.

B5. The method of B4, wherein the width of the flexible PV module is less than 20 inches and the spacing is 12 inches.

B6. The method according to any one of paragraphs B0 through B5, wherein the second elongate mounting bracket comprises an upper plate secured to the flexible PV module and a second stem portion extending transversely from the upper plate, such that the second flange extends from the second stem portion parallel to the upper plate and a distal end of the second flange is spaced from the upper plate, defining the second channel.

B7. The method according to any one of paragraphs B0 through B6, further comprising:

securing the second mounting bracket to the flexible PV module.

B8. The method of B7, wherein securing the second mounting bracket to the flexible PV module includes using an adhesive.

B9. The method of B8, wherein the adhesive comprises a mastic adhesive.

B10. The method according to any one of paragraphs B0 through B9, wherein the flexible PV module includes a plurality of copper indium gallium diselenide (CIGS) PV cells.

B11. The method according to any one of paragraphs B0 through B10, further comprising:

preventing lateral edges of the flexible PV module from moving upward by securing a first ridge cap on a second major rib adjacent a first lateral edge of the flexible PV module and securing a second ridge cap on a third major rib adjacent a second lateral edge of the flexible PV module;

wherein each of the first and second ridge caps includes at least one side wing configured to abut a top face of the flexible PV module.

B12. The method according to any one of paragraphs B0 through B11, wherein the second elongate mounting bracket is disposed along a central longitudinal axis of the flexible PV module.

Advantages, Features, and Benefits

The different embodiments and examples of the systems and methods described herein provide several advantages over known solutions for mounting PV modules to a building. For example, illustrative embodiments and examples described herein allow the mounting of BAPV modules without applying adhesive to the entire back of the module, thereby reducing cost and material usage.

Additionally, and among other benefits, illustrative embodiments and examples described herein facilitate easy removal and replacement of individual PV modules.

Additionally, and among other benefits, illustrative embodiments and examples described herein may be mounted on a PBR or other ribbed rooftop with little or no modification of the rooftop panels.

Additionally, and among other benefits, illustrative embodiments and examples described herein may be mounted on ribbed rooftops without being required to conform to the undulating contours of the ribbed roofing panels.

Additionally, and among other benefits, illustrative embodiments and examples described herein may use existing 494-mm width flexible PV panels on PBR roofs having standard 12-inch rib spacing.

Additionally, and among other benefits, illustrative embodiments and examples described herein prevent water incursion into edges of the PV module by enforcing separation of the edges from the rooftop.

Additionally, and among other benefits, illustrative embodiments and examples described herein prevent PV module damage or loss due to wind uplift by including ridge caps to block upward movement of the module edges.

No known system or device can perform these functions, particularly with respect to flexible photovoltaics. Thus, the illustrative embodiments and examples described herein are particularly useful for mounting flexible PV modules on ribbed rooftops. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A system for mounting flexible photovoltaic (PV) modules on a roof, the system comprising:
   a first elongate mounting bracket including a base configured to be coupled to a first rib of a ribbed rooftop and a first flange extending parallel to the base to define a first channel, such that a distal end of the first flange is spaced from the base;
   a flexible PV module having a second elongate mounting bracket oriented along a central longitudinal axis of the flexible PV module, the second elongate mounting bracket including an upper plate secured to the flexible PV module and a second flange extending parallel to the upper plate to define a second channel, such that a distal end of the second flange is spaced from the upper plate;
   a plurality of standoffs configured to be coupled to a lower face of the flexible PV module, the plurality of standoffs collectively configured to prevent contact between lateral edges of the PV module and the rooftop; and
   a first ridge cap configured to be affixed to a second rib of the rooftop and a second ridge cap configured to be affixed to a third rib of the rooftop;
   wherein each of the first and second ridge caps includes at least one side wing configured to abut a top face of the flexible PV module;
   wherein the system is transitionable between (a) a roof-mounted configuration, in which the second elongate mounting bracket is coupled to the first elongate mounting bracket, the first flange being received by the second channel and the second flange being received by the first channel, and (b) an unmounted configuration, in which the second elongate mounting bracket is decoupled from the first elongate mounting bracket and the flexible PV module is separated from the rooftop; and
   wherein when the system is in the roof-mounted configuration, the lateral edges of the module are disposed closer to the roof than the central longitudinal axis of the module, with a first lateral edge of the module overlapped by the first ridge cap in a laterally sliding fit and a second lateral edge of the module overlapped by the second ridge cap in a laterally sliding fit.

2. The system of claim 1, further comprising a plurality of aligned apertures in respective end portions of the first elongate mounting bracket and the second elongate mounting bracket, the plurality of aligned apertures configured to receive a fastener.

3. The system of claim 1, wherein the second elongate mounting bracket is at least as long as the flexible PV module.

4. The system of claim 1, wherein the flexible PV module has a width measured between the lateral edges of the flexible PV module, and a length longer than the width.

5. The system of claim 4, wherein the ribbed rooftop has a rib spacing distance, and the width of the flexible PV module is less than two times the rib spacing distance.

6. The system of claim 1, wherein each standoff comprises a T-shaped attachment extending lengthwise along at least a portion of each lateral edge.

7. A system for mounting flexible photovoltaic (PV) modules on a roof, the system comprising:
   a first elongate mounting bracket including a base configured to be coupled to a first rib of a ribbed rooftop, a first stem portion extending transversely from the base, and a first flange extending parallel to the base from the first stem portion, such that a distal end of the first flange is spaced from the base, defining a first channel;
   a flexible PV module;
   a second elongate mounting bracket attached to the flexible PV module and including an upper plate secured to the flexible PV module, a second stem portion extending transversely from the upper plate, and a second flange extending from the second stem portion parallel to the upper plate, such that a distal end of the second flange is spaced from the upper plate, defining a second channel;
   a plurality of standoffs configured to be coupled to a lower face of the flexible PV module, the plurality of standoffs collectively configured to prevent contact between lateral edges of the PV module and the rooftop; and
   a first ridge cap configured to be affixed to a second rib of the rooftop and a second ridge cap configured to be affixed to a third rib of the rooftop;
   wherein each of the first and second ridge caps includes at least one side wing configured to abut a top face of the flexible PV module;
   wherein the system is transitionable between (a) a roof-mounted configuration, in which the second elongate mounting bracket is coupled to the first elongate mounting bracket, the first flange being received by the second channel and the second flange being received by the first channel, and (b) an unmounted configuration, in which the second elongate mounting bracket is decoupled from the first elongate mounting bracket and the flexible PV module is separated from the rooftop; and wherein when the system is in the roof-mounted configuration, the lateral edges of the module are disposed closer to the rooftop than a longitudinal central axis of the module, with a first lateral edge of the module overlapped by the first ridge cap in a laterally sliding fit and a second lateral edge of the module overlapped by the second ridge cap in a laterally sliding fit.

8. The system of claim 7, further comprising a plurality of aligned apertures in respective end portions of the first elongate mounting bracket and the second elongate mounting bracket, the plurality of aligned apertures configured to receive a fastener.

9. The system of claim 7, wherein the upper plate is secured to the flexible PV module by an adhesive.

10. The system of claim 7, wherein the second elongate mounting bracket is disposed along the central longitudinal axis of the flexible PV module.

11. The system of claim 7, wherein the first elongate mounting bracket is at least as long as the flexible PV module.

12. The system of claim 7, wherein each standoff comprises a T-shaped attachment extending lengthwise along at least a portion of each lateral edge.

13. A method for mounting a flexible photovoltaic (PV) module on a roof, the method comprising:

securing a first elongate mounting bracket to a roofing panel, the roofing panel including a plurality of major ribs having a consistent spacing, such that a base of the first elongate mounting bracket is secured to a first major rib of the plurality of major ribs, the first elongate mounting bracket further including a first stem portion extending transversely from the base and a first flange extending parallel to the base from the first stem portion, such that a distal end of the first flange is spaced from the base, defining a first channel;

securing a first ridge cap on a second major rib of the roofing panel;

securing a second ridge cap on a third major rib of the roofing panel;

mounting a flexible PV module having a second elongate mounting bracket to the roofing panel by inserting a second flange of the second mounting bracket into the first channel of the first mounting bracket and inserting the first flange of the first mounting bracket into a second channel of the second mounting bracket;

sliding a first lateral edge of the flexible PV module under the first ridge cap; and sliding a second lateral edge of the flexible PV module under the second ridge cap;

wherein each of the first and second ridge caps includes at least one side wing configured to abut a top face of the flexible PV module and thereby to prevent the first and second lateral edges of the flexible PV module from moving upward;

wherein the first and second lateral edges of the module are disposed closer to the roof than a central longitudinal axis of the module; and wherein the first and second lateral edges of the flexible PV module are prevented from contacting the roofing panel by a plurality of standoffs coupled to a lower face of the flexible PV module.

14. The method of claim 13, wherein the flexible PV module has a concave-down profile, such that lateral edges of the flexible PV module are disposed closer to the roof than is the central longitudinal axis of the flexible PV module.

15. The method of claim 13, wherein the second elongate mounting bracket comprises an upper plate secured to the flexible PV module and a second stem portion extending transversely from the upper plate, such that the second flange extends from the second stem portion parallel to the upper plate and a distal end of the second flange is spaced from the upper plate, defining the second channel.

16. The method of claim 13, further comprising securing the second mounting bracket to the flexible PV module.

* * * * *